March 7, 1933.    G. EGLOFF    1,900,171
PROCESS AND APPARATUS FOR CONVERTING OILS
Original Filed Oct. 31, 1921    2 Sheets-Sheet 1
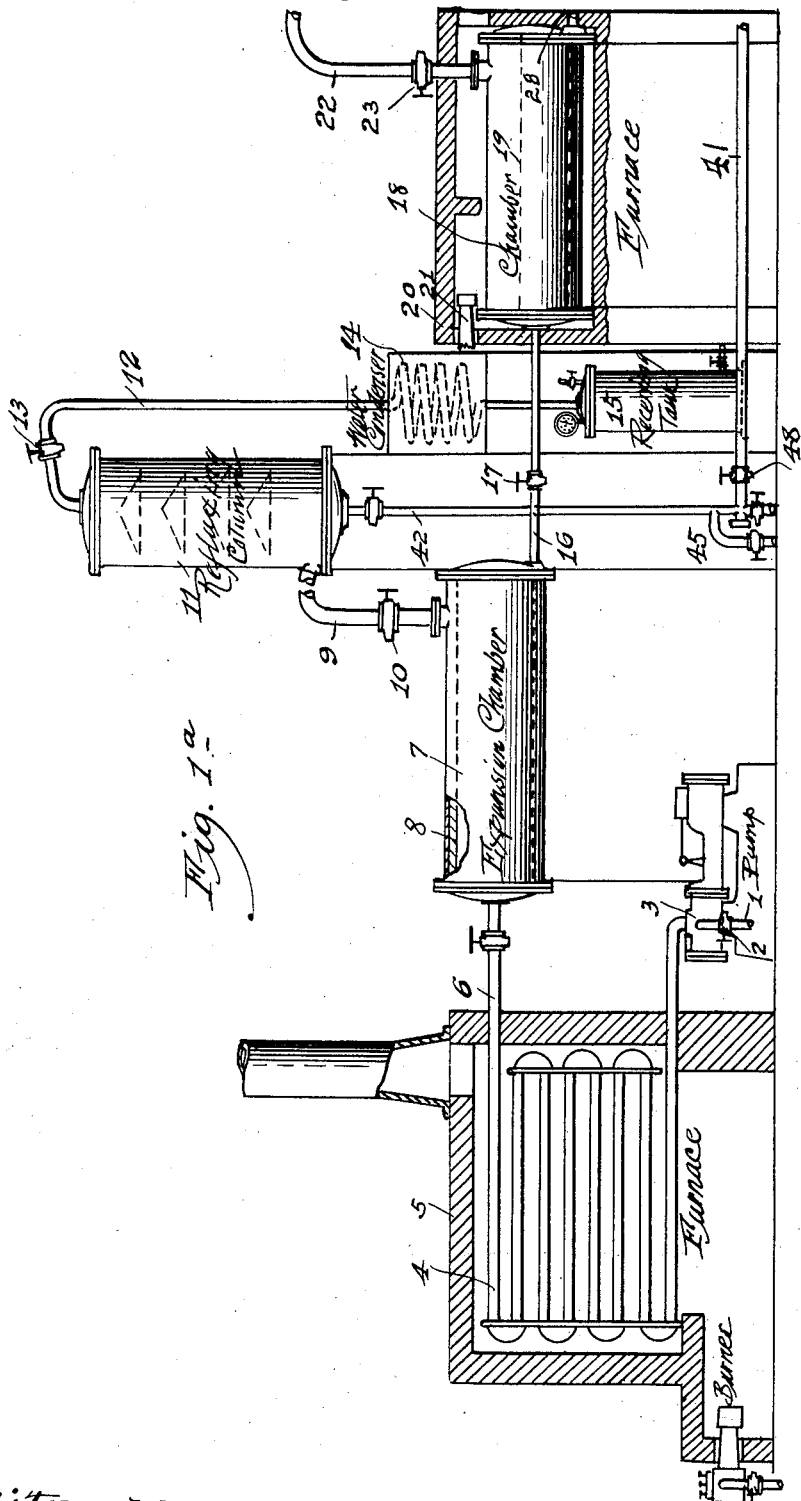
Witness,
Inventor,
Gustav Egloff
By Frank L. Belknap

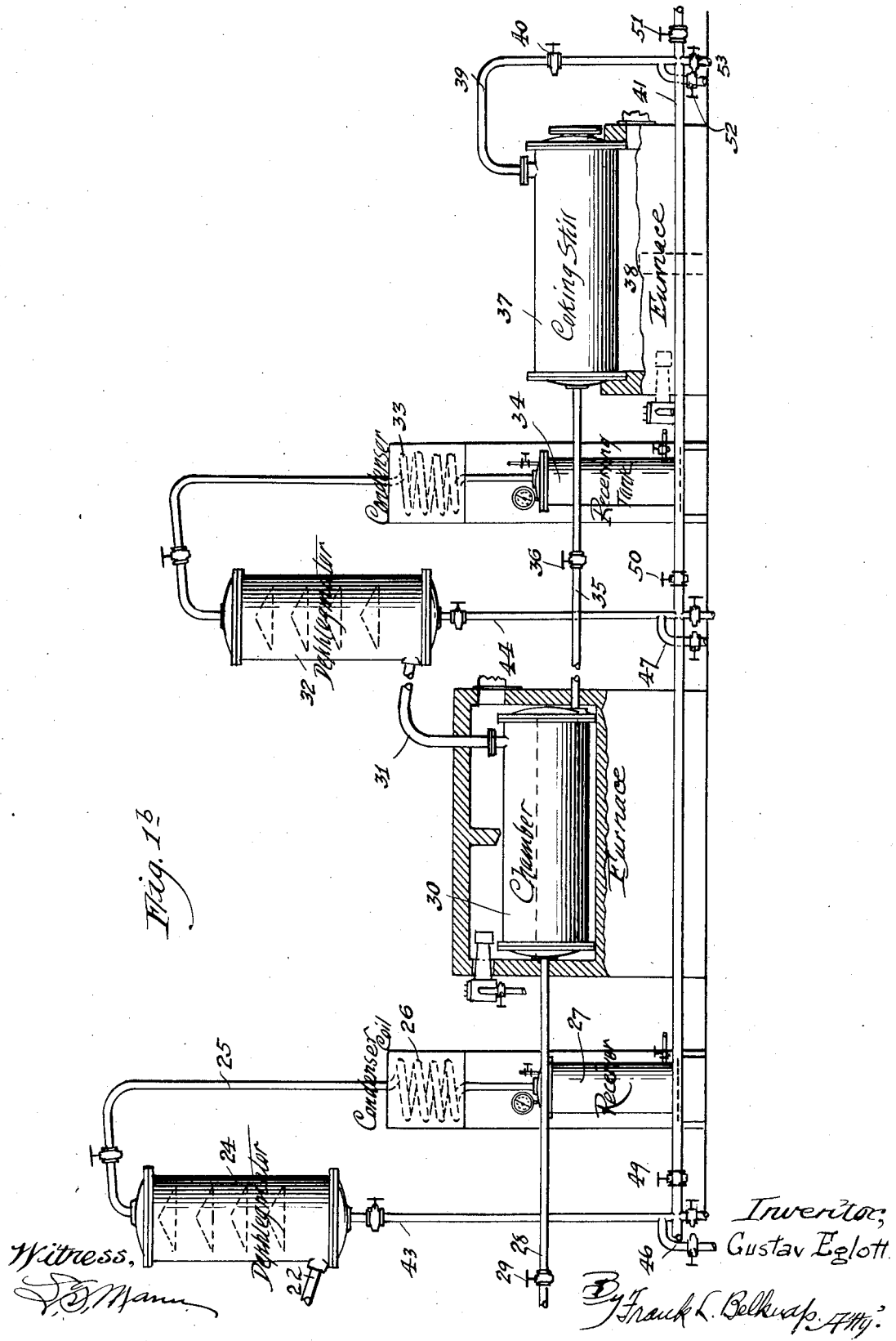

Patented Mar. 7, 1933

1,900,171

UNITED STATES PATENT OFFICE

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR CONVERTING OILS

Application filed October 31, 1921, Serial No. 511,902. Renewed December 15, 1928.

This invention relates to improvements in process and apparatus for converting oils and refers more particularly to a process to relieve heavy oils from their lighter fractions.

Among the salient objects of the invention are to provide a process in which the oil is passed through successive stages of conversion in which, due to differential pressure and temperature conditions, fractions having somewhat different characteristics are removed from the oil body; to provide a process in which the more refractory oils which are separated as reflux in the different zones of distillation or conversion are removed from the system; to provide a process in which the removal of these more refractory oils permits a more complete conversion of the oil in the separate stages as the presence of the refractory reflux retards the conversion when reintroduced to a zone of distillation; to provide an apparatus for carrying out the above described process.

In the drawings:

Figs. 1a and 1b show a side elevational view of the apparatus, Fig. 1b being a continuation of the apparatus shown in Fig. 1a.

Describing more particularly the drawings, the raw oil is introduced through the inlet line 1, controlled by a valve 2 and is charged by means of the pump 3 through the heating coils 4 mounted in a furnace 5. In this heating zone, the oil is subjected to cracking temperature and high pressure in order that a proper conversion of the oil body may be obtained. It is a well known fact that where the oil is subjected to a regulated pressure, a better quality of distillate may be obtained from the vapors generated therefrom after conversion or cracking has taken place. The oil, after being heated in the furnace passes through the transfer line 6 to the initial conversion zone. This initial conversion takes place in the expansion chamber 7, which is preferably of the construction shown, with an insulating refractory brick or cement 8 lining the interior shell of the chamber. The purpose of this lining is to prevent loss of heat and at the same time, reduce the temperature to which the steel shell is subjected during the conversion reaction. During the conversion, the oil is maintained under a high pressure and it is desirable where a steel shell or chamber of this character is subjected to a high pressure, that it shall not also have to undergo a high temperature. As is well known, high temperatures reduce to an extent the strength and capabilities of the still and for this reason, the conditions in the initial zone might involve dangers from fire or explosion were the shell of the chamber in direct contact with the high oil temperature. In this initial zone, there is relieved from the oil a volume of vapors which pass off through the line 9 controlled by a valve 10 and after being dephlegmated in the refluxing column 11, pass over through the line 12 controlled by a valve 13 to the water condenser 14. After being condensed, the vapors are collected as distillate in the receiving tank 15.

The unvaporized portion of the oil in the initial zone or conversion chamber 7 passes to a second zone where further conversion takes place. The oil from the chamber 7 passes through the line 16 controlled by a pressure regulating valve 17 to the chamber 18. This chamber is somewhat similar to the primary chamber except that instead of being entirely lined with firebrick or a refractory cement insulating material, the insulation or lining extends only about half way up the sides of the shell as shown by the dotted line 19. The chamber is mounted in a furnace 20 which is top fired as shown by means of burners 21. In this manner, the chamber may be heated without danger of causing hot spots from carbon accumulation common to stills or other distillation apparatus where the heat is applied from below. The pressure in this chamber is also reduced and with this release of pressure, there are generated vapors which pass off through the line 22 in which is interposed a throttle valve 23. These vapors as in the initial zone, are refluxed in the dephlegmator 24 and are subjected to a condensing action on passing through the line 25 which directs them to the condenser coil 26. The vapors from the secondary zone after condensation are collected in the receiver 27. The unvaporized product passes from the secondary zone through the line 28 in which is a pressure regulating valve 29 similar to that shown at 17.

The next succeeding zone where the oil is treated is the chamber 30 which is similarly insulated and constructed as the chamber 18, is likewise top-fired in order to keep the oil at a proper temperature for conversion. The pressure on the oil body in this zone is lowered correspondingly so that the vapors pass up through the line 31, through the dephlegmator 32 and condenser 33, producing a third fractionation in the form of a distillate collected in the receiving tank 34. From the chamber 30, the unvaporized oil is passed through the line 35 controlled by a pressure regulating valve 36 to a final coking still 37 which is mounted above a furnace 38. In this final stage, the unvaporized oil is distilled until the residual product is a very heavy sludge or coky substance which is collected in the bottom of the still and is cleaned from time to time as the carbon accumulation becomes objectionable. The vaporous distillation products pass off through the line 39 in which is a valve 40, the pipe 39 connecting with a reflux line 41.

The reflux condensate which is separated out in each of the dephlegmators 11, 24 and 32, consists of an oil which is of a character that it is difficult to crack and retards the conversion of any oil to which it is added. When this oil is isolated from the system and is treated separately, it has been found that more efficient operation may be obtained, and the cost of operation materially reduced due to the fact that it is unnecessary to maintain as high temperatures in each of the succeeding zones of the system in order to procure the same amount of conversion. For these reasons, the reflux oil from each of the dephlegmators may be drawn off through the reflux lines 42, 43 and 44 respectively and directed through the by-pass lines 45, 46 and 47 to separate storage tanks or combined in the line 41, which is controlled by the valves 48, 49, 50 and 51 and thence directed to a separate apparatus for conversion. The isolation of this oil greatly enhances the efficient operation of the process and relieves the system of one of its most objectionable burdens as far as retreatment is concerned, namely, the removal of the refractory reflux condensates.

In the operation of the process, the following conditions of pressure and temperature may be obtained to procure substantially complete conversion. In the initial zone, the oil is maintained at a temperature of from 800 to 1000 degrees F. and at a pressure of 1500 pounds. In the second zone, the pressure is reduced to 900 pounds and a temperature ranges from 750 to 875 degrees F. In the third zone, a further reduction of pressure to 500 pounds with a temperature decrease from 700 to 800 degrees F. In the final or coking still, the temperatures may be regulated to conform with the heat required to reduce the final product to coke. The distillate which passes over from the final or coking still may be combined with the reflux or may be drawn off separately through the line 52 controlled by a valve 53.

I claim as my invention:

1. A process for converting hydrocarbon oils, consisting in passing the oil in a small stream through a furnace heated to a cracking temperature and thence through a series of vaporizing chambers serially connected and of progressively decreasing pressures, while maintaining a pressure in excess of 500 pounds throughout said chambers, removing, dephlegmating and condensing the generated vapors from each of said chambers, isolating the reflux condensate formed by dephlegmation from the separate vapor chambers, finally reducing the unvaporized product to coke in a coking still.

2. In an apparatus for converting hydrocarbon oils, the combination with a means for raising the oil to a cracking temperature while maintaining a substantial pressure thereon, of a series of vaporizing chambers serially connected therewith, means for dephlegmating and condensing the vapors generated in the respective vaporizing chambers, means for maintaining decreasing pressures upon the successive vaporizing chambers, and a reflux header adapted to remove from the system the reflux condensate separated in the respective dephlegmators from the vapors generated in the separate vaporizing chambers.

3. A hydrocarbon oil cracking process which comprises flowing the oil through a restricted heating zone and heating the oil therein under superatmospheric pressure to a cracking temperature, discharging the heated oil into a reaction zone maintained under superatmospheric pressure wherein conversion of the oil occurs, separately removing unvaporized oil and evolved vapors from said reaction zone, dephlegmating said vapors and isolating the resultant reflux condensate from the process, passing said unvaporized oil through a series of pressure reduction zones maintained under successively lower pressures and effecting further vaporization of said unvaporized oil therein, reducing the unvaporized oil to coke in the last of said pressure reduction zones, condensing heavier fractions of the vapors evolved in said pressure reduction zones, and preventing return of the resultant condensates to said heating zone.

GUSTAV EGLOFF.